US011716360B2

(12) United States Patent
Aigner et al.

(10) Patent No.: US 11,716,360 B2
(45) Date of Patent: Aug. 1, 2023

(54) INITIATION OF REAL-TIME MEDIA PROCESSING IN RESPONSE TO A TRIGGER EVENT

(71) Applicant: Avaya Management L.P., Durham, NC (US)

(72) Inventors: Jeffery Aigner, Maple Valley, WA (US); Matthew Peters, Redmond, WA (US); Robert Braudes, Erie, CO (US)

(73) Assignee: Avaya Management L.P., Durham, NC (US)

( * ) Notice: Subject to any disclaimer, the term of this patent is extended or adjusted under 35 U.S.C. 154(b) by 112 days.

(21) Appl. No.: 17/148,225

(22) Filed: Jan. 13, 2021

(65) Prior Publication Data
US 2022/0116428 A1 Apr. 14, 2022

Related U.S. Application Data

(60) Provisional application No. 63/090,011, filed on Oct. 9, 2020.

(51) Int. Cl.
H04L 65/1069 (2022.01)
H04L 65/1104 (2022.01)
H04L 65/60 (2022.01)
G10L 25/63 (2013.01)

(52) U.S. Cl.
CPC ...... *H04L 65/1069* (2013.01); *H04L 65/1104* (2022.05); *H04L 65/60* (2013.01); *G10L 25/63* (2013.01)

(58) Field of Classification Search
None
See application file for complete search history.

(56) References Cited

U.S. PATENT DOCUMENTS

| 8,634,543 | B2 | 1/2014 | Flockhart et al. |
| 9,071,684 | B2 * | 6/2015 | Byron ............... H04L 65/1094 |
| 9,185,626 | B1 * | 11/2015 | Kunkel ............. H04L 65/1016 |
| 10,742,692 | B2 * | 8/2020 | Sandgren ......... H04L 65/1045 |
| 2010/0235218 | A1 | 9/2010 | Erhart et al. |
| 2010/0296417 | A1 | 11/2010 | Steiner |

(Continued)

FOREIGN PATENT DOCUMENTS

| EP | 3618390 A1 * | 3/2020 | ......... H04L 65/1006 |
| WO | WO-2010015893 A1 * | 2/2010 | ......... H04L 65/1006 |

OTHER PUBLICATIONS

Hutton et al. "An Architecture for Media Recording Using the Session Initiation Protocol," IETF Trust, May 2014, RFC 7245, 16 pages.

(Continued)

*Primary Examiner* — Uzma Alam
(74) *Attorney, Agent, or Firm* — Sheridan Ross P.C.

(57) ABSTRACT

Calls between a customer and an agent often require additional processing of the media in real time. Processing every call in such a manner is often unnecessary and the results deleted or ignored, or prohibited due to a policy for certain calls. Knowing if a call should be processed may be determined too late for the media to be forked. While the customer and agent may engage in the call as a peer-to-peer connection, additional processing requires holding the initial invite long enough, such as with a preservation message, that a session boarder controller may fork the call for subsequent processing without timing out.

20 Claims, 6 Drawing Sheets

(56) References Cited

U.S. PATENT DOCUMENTS

| | | | |
|---|---|---|---|
| 2011/0122863 A1* | 5/2011 | Balasaygun | H04L 65/1104 370/352 |
| 2011/0125793 A1 | 5/2011 | Erhart et al. | |
| 2011/0125826 A1 | 5/2011 | Erhart et al. | |
| 2012/0179833 A1* | 7/2012 | Kenrick | H04N 19/40 709/231 |
| 2014/0086399 A1* | 3/2014 | Haserodt | H04M 3/42178 379/201.12 |
| 2017/0026512 A1* | 1/2017 | Ezell | H04L 65/1083 |
| 2017/0214534 A1* | 7/2017 | Rivas Molina | H04W 4/16 |
| 2017/0346697 A1* | 11/2017 | Kumar | H04L 41/0896 |
| 2022/0022272 A1* | 1/2022 | Kondeti | H04L 65/1104 |

OTHER PUBLICATIONS

Portman et al. "Session Recording Protocol," IETF Trust, May 2016, RFC 7866, 45 pages.
Ravindranath et al. "Session Initiation Protocol (SIP) Recording Metadata," IETF Trust, May 2016, RFC 7865, 34 pages.
Ravindranath et al. "Session Initiation Protocol (SIP) Recording Call Flows," IETF Trust, Feb. 2017, RFC 8068, 34 pages.
Rehor et al. "Use Cases and Requirements for SIP-Based Media Recording (SIPREC)," IETF Trust, Aug. 2011, RFC 6341, 16 pages.
Rosenberg et al. "SIP: Session Initiation Protocol," The Internet Society, Jun. 2002, RFC 3261, 252 pages.

\* cited by examiner

INITIATION OF REAL-TIME MEDIA PROCESSING IN RESPONSE TO A TRIGGER EVENT

CROSS REFERENCE TO RELATED APPLICATIONS

The present application claims the benefit of and priority, under 35 U.S.C. § 119, to U.S. Provisional Application Ser. No. 63/090,011, filed on Oct. 9, 2020, entitled "USE OF CTI EVENTS TO DETERMINE ACCEPTANCE OF SIPREC MEDIA STREAM AND TO INITIATE THE STREAM IF ACCEPTABLE," the entire disclosure of which is hereby incorporated herein by reference, in its entirety, for all that it teaches and for all purposes.

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for streaming media processing and particularly to selectively allocating bandwidth and computational resources for real-time media processing.

BACKGROUND

Calls into a contact center, such as from a customer reaching a human or automated agent, are often configured for additional processing beyond merely connecting the agent and customer to address the purpose of the call. For example, calls may be recorded, and utilize additional connectivity, recording, and data storage resources or require real-time, or near real-time analysis, such as to analyze the call to determine an emotion of the customer and, if appropriate, initiate action to attenuate the emotion, such as by having a supervisor or subject matter expert join the call. Analysis may involve video or image processing, for calls comprising video or document (e.g., image) sharing.

Not all calls need such a degree of monitoring. For example, calls to a new agent may be monitored and analyzed at a greater frequency than calls to a more senior agent. In another example, a particular subject matter may trigger the additional processing. A call from a customer merely asking for an account balance may waste communication and processing resources if recorded. In contrast, calls having a particular subject (e.g., a new product, the purchase of an expensive item, a serious defect, etc.) may require recording, real-time analysis, and/or other processing. Therefore, it can be essential to allocate communication and processing resources to the calls that require such resources and not burden the system when such resources are unnecessary.

SUMMARY

Customers often trigger an excessive number of calls being sent to applications providing additional services placing varying demands on media resources; resources that connect and/or process media, beyond agent resources, such as to record a call or analyze the vocalizations to determine an emotion of the customer. Establishing and transmitting media is computationally expensive, and causes excessive usage of Session Border Controllers, Media Servers, network bandwidth, etc. In the prior art, Session Initiation Protocol (SIP) utilizes call forking to send the call media to the agent and, optionally, to one or more applications for processing of the media (e.g., recording, analysis, etc.). The determination of whether or not to utilize such media resources for additional call processing is performed prior to accepting the media of the call. Adding media resources after the media is accepted is computational and networking infrastructure-intensive. In many cases, different protocols and data streams may be coordinated to make the determination of whether or not to process a call with the media resources.

Currently, media streams are established when signaling starts. For example, when a SIP or SIP record (SIPREC) INVITE message is received, the media path is negotiated for all calls, whether or not the media is ultimately processed.

These and other needs are addressed by the various embodiments and configurations of the present invention. The present invention can provide a number of advantages depending on the particular configuration. These and other advantages will be apparent from the disclosure of the invention(s) contained herein.

Certain embodiments herein rely on SIP or similar packet-based communication utilizing a separate signaling path and media paths. Accordingly, SIP RFC 3261, RFC 6341, RFC 7245, RFC 7865, RFC 7866, and RFC 8068 are each included herein by reference for all they tech and documents referenced therein. Each RFC may be accessed at various locations including, https://tools.ietf.org/html/rfcxxxx, where "xxxx" is the RFC number.

In one embodiment, when a SIPREC INVITE is received from a customer communication device, instead of accepting it, messages (such as, 100 TRYING) are periodically returned until either a Computer Telephony Integration (CTI) message is received from a CTI server (or other event sharing server) or a timeout occurs. If a CTI message is received, the system is queried with the relevant contents of the message to determine if the call is of interest; if so, then standard SIP processing is used to negotiate the media for the call. If the call is not of interest, or no CTI message is received prior to the configurable timeout (which may be different for inbound and outbound calls) then the INVITE is refused.

This solution minimizes the load on the sending SIP endpoint, which is typically a Session Border Controller (SBC), as no media path is established for unwanted calls.

In one embodiment, a method for selectively processing real-time media is disclosed, comprising: receiving, via a network interface to a network, a request for a communication session from a customer communication device, wherein the request for the communication session comprises a Session Initiation Protocol (SIP) INVITE message and wherein the INVITE is received by a session boarder controller (SBC) and wherein the communication session comprises a media portion and a signaling portion; determining whether the media portion should be forked; waiting for a forking event to be received; while waiting, providing a series of preservation messages to the SBC at an interval therebetween that is less than a first timeout interval of the SBC; and upon receiving the forking event, signaling the SBC to route one fork for connection to an agent communication device and route a second fork to a media processing server.

In another embodiment, a system for selectively processing real-time media is disclosed, comprising: a session boarder controller (SBC) comprising a network interface to a network; a media processing server; a signaling server; wherein each of the SBC, media server, and signaling server are interconnected and each comprise a processor with machine-readable instructions maintained in a non-transitory memory that, when read by the processor, cause the processor to execute the machine-readable instructions; wherein the SBC, via the network receives a request for a communication session from a customer communication device, wherein the request for the communication session comprises a Session Initiation Protocol (SIP) INVITE message, the communication session comprises a media portion and a signaling portion; wherein the SBC, in response to receiving the SIP INVITE, provides a second SIP INVTE to the signaling server which responds with a series of preservation messages to the SBC at an interval therebetween that is less than a first timeout interval of the SBC; wherein the SBC, while receiving the series of preservation messages, waits for a forking signal; and wherein the SBC, upon receiving the forking signal, creates and routes one fork for connection to an agent communication device and creates and routes a second fork to the media processing server.

In another embodiment, a method for selectively processing real-time media is disclosed, comprising: selecting a customer and an agent to engage in a communication session over a network utilizing a customer communication device and an agent communication device, respectively and wherein the communication session comprises a media portion and a signaling portion; prompting an event server to provide a forking event, wherein the prompting comprises a number of prompts intermittently sent to the event server terminated upon a timeout; and upon receiving the forking event prior the timeout, sending, via a network interface to a network, a request for the communication session to the customer communication device, wherein the request for the communication session comprises a Session Initiation Protocol (SIP) INVITE message and wherein the INVITE is sent by a session boarder controller (SBC) and signaling the SBC to route one fork for connection to an agent communication device and route a second fork to a media processing server.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
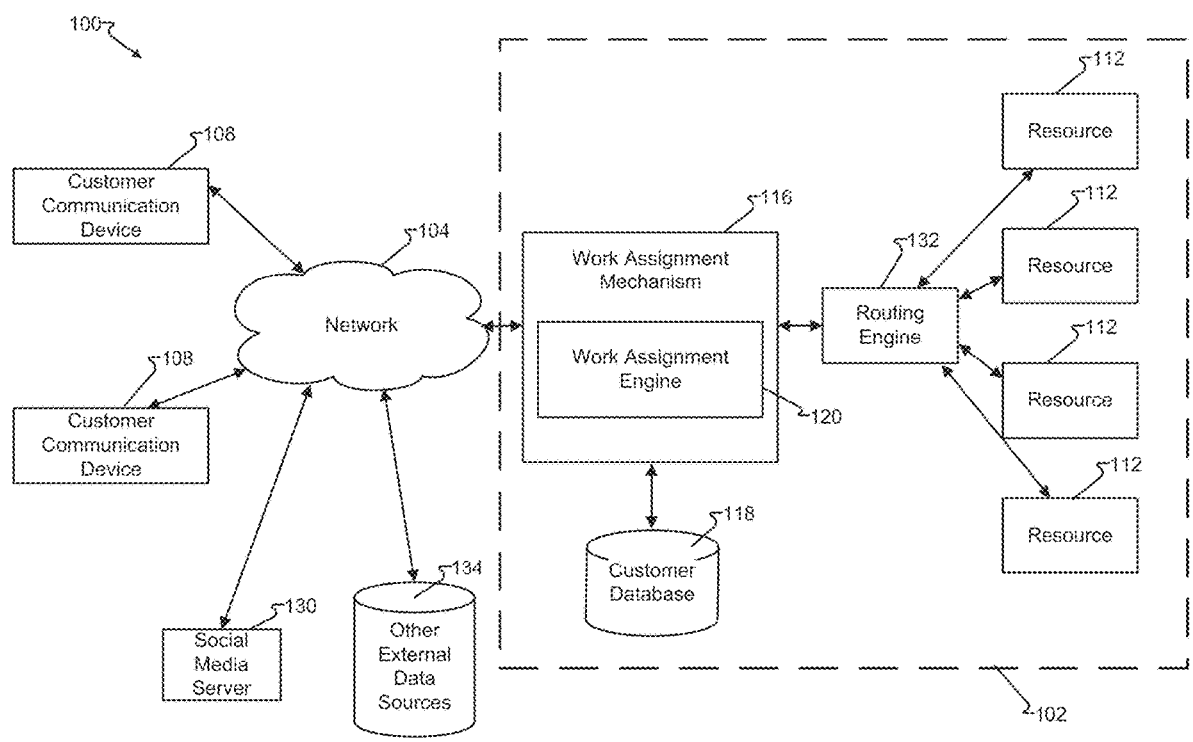
FIG. 1 depicts a first system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
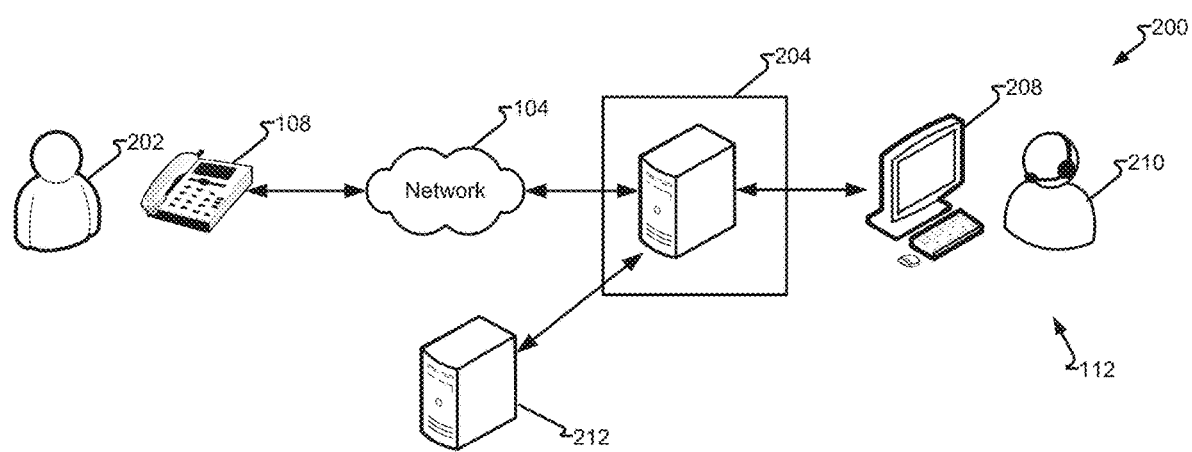
FIG. 2 depicts a second system in accordance with embodiments of the present disclosure.

FIG. 2 depicts system 200 in accordance with embodiments of the present disclosure. In one embodiment, system 200 comprises the components of system 100, some of which are omitted with respect to system 200 to avoid unnecessarily complicating the figure and related description. System 200 comprises additional components, such as to selectively enable the forking of a media portion of a communication for subsequent processing.

In one embodiment, customer 202 utilizes customer communication device 108 to initiate a communication with agent 210. Agent 210 may be specifically requested by customer 202 or agent 210 may be one agent from a pool of agents determined subsequent to the initiation of the communication. While embodiments herein are generally directed to audio-only calls, it should be appreciated that other real-time media communications (e.g., video) may be utilized additionally or alternatively to audio without departing from the scope of the embodiments herein.

The request for the communication (e.g., a voice call) is received by contact center equipment 204, as will be described more completely with respect to embodiments that follow. The call is optionally first routed to resource 112 embodied as an automated agent, such as an interactive voice response system or other automated service. A determination is made to route the call to resource 112 embodied as agent 210 via agent communication device 208. A media session is then established between customer communication device 108 and agent communication device 208 and, thereon, customer 202 and agent 210 may provide communication content in the form of speech.

In another embodiment, processing the media (beyond that provided by resource 112) is provided. Accordingly, the call may be forked such that one media stream is routed to agent communication device 208 and a second media stream is routed to media processing server 212. Media processing server 212 may provide resource-intensive processing for a subset of communications. Due to system limitations, it is often impossible to provide media processing for all calls due to port exhaustion, bandwidth exhaustion, and/or processor exhaustion. Accordingly, a rule may be established and embodied as machine-readable instructions maintained in a non-transitory memory, such as a memory of a server of contact center equipment 204, cause a processor, such as of the server of contact center equipment 204, to execute the rule. The rule may determine that a subset of a pool of agents, one of which being agent 210, are to be monitored and thereby have the media sent to media processing server 212 for subsequent processing.

The media processing provided by media processing server 212 may include, transcription, recording, or other analysis, such as to determine emotion of customer 202 from voice attributes of the speech provided by customer 202 as the content of the media. Additionally or alternatively, media processing server 212 may process a video image of customer 202, when customer communication device 108 is embodied to capture and transmit a video image of customer 202. The video image then being recorded and/or analyzed, such as to determine an emotion from facial expressions, body position, and or other visual attribute.

While an invite to any agent or agent communication device may comprise a Session Initiation Protocol (SIP)-based media recording (SIPREC) INVITE, not all will be selected to cause only a portion of the resulting calls to be recorded or otherwise processed by media processing server 212. Additionally, not all calls that are selected will be processed by media processing server 212. This is often due to a validation process that determines that, although selected, subsequent processing is not to occur. For example, a fifty-person team of agents, one of which is agent 210, is designated to have their calls transcribed at a rate of 10% (i.e., five of the agents). Configuring the selected five, which may be dynamically determined, requires a significant effort. As a result the SIPREC INVITE is received for all calls to the team. However, subsequent rules may limit the transcription to only calls that are relevant, for example, a portion of the fifty-person team may be designated for a particular type of call (e.g., calls from customers having a particular issue to resolve, customers speaking a particular language, a particular service or product, etc.). The determination of whether the call is valid for media processing by media processing server 212 may be unknown until after a particular subject matter is selected, which is associated with the agent. For example, "Press 1 to rebook an international flights," maybe selected by customer 202, which may be designated for subsequent processing, but if customer 202 selects a different option, processing is unnecessary and, if utilized would burden the system resources to have the subsequent processing ignored or discarded. Therefore, routing of a call to particular agent (e.g., agent 210) via their respective device (e.g., agent communication device 208) is determined prior to the determination of whether processing by media processing server 212 is to be utilized. Media processing server 212 may be physically separated, such as a server of a distributed or "cloud" based computing platform.

Figure 3:
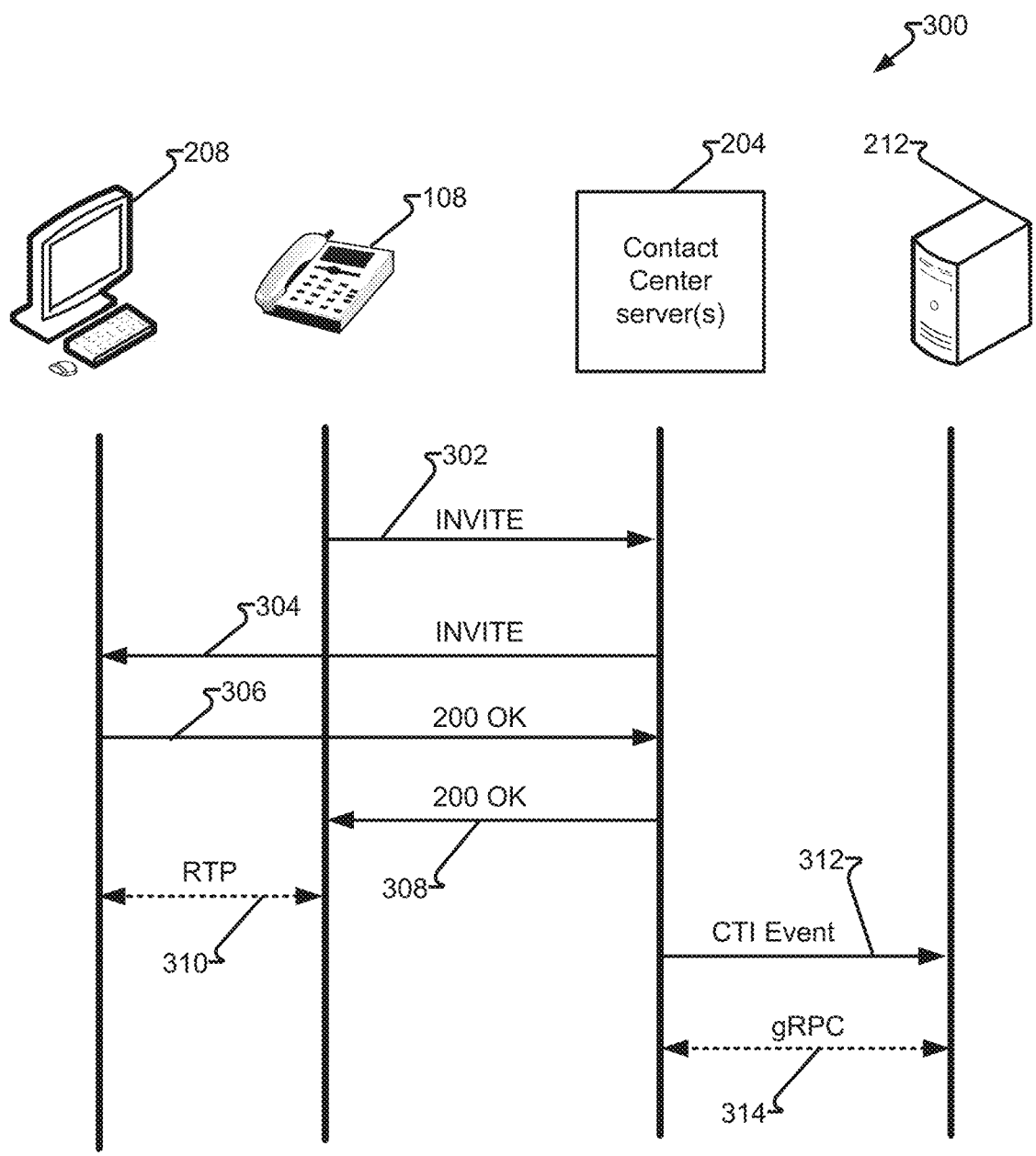
FIG. 3 depicts a first interaction in accordance with embodiments of the present disclosure.

FIG. 3 depicts interaction 300 in accordance with embodiments of the present disclosure. In one embodiment, interaction 300 is embodied as machine-executable instructions maintained in a non-transitory memory that, when read by a processor(s), cause the processor to perform portions of interaction 300. Interaction 300 begins with customer communication device 108 sending message 302 (INVITE) to contact center equipment 204. In response, contact center equipment 204 submits message 304 (INVITE) to agent communication device 208. In response, message 306 (200 OK) to contact center equipment 204 which, in response, sends message 308 (200 OK) to customer communication device 108. As a result real-time transfer protocol (RTP) session 310, also known as a media portion of a session comprising encoded voice and/or video content, is exchanged between agent communication device 208 and customer communication device 108. CTI events 312 are provided to media processing server 212 as they occur and throughout the interaction. Contact center equipment 204 additionally forks the media to provide RTP session 314, which may comprise remote procedure call (RPC) such as "gRPC."

Figure 4:
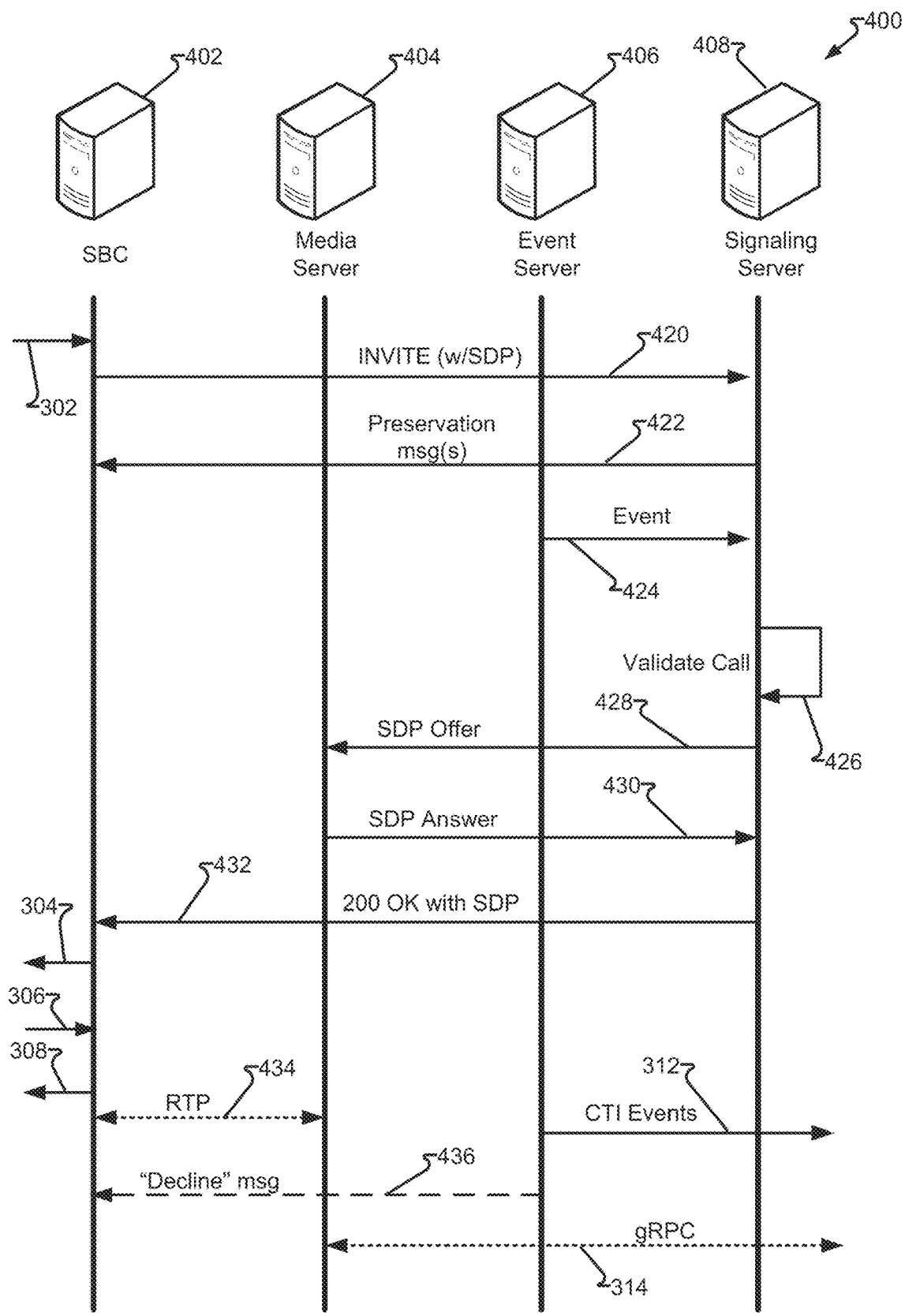
FIG. 4 depicts a second interaction in accordance with embodiments of the present disclosure.

FIG. 4 depicts interaction 400 in accordance with embodiments of the present disclosure. In one embodiment, interaction 400 is embodied as machine-executable instructions maintained in a non-transitory memory that, when read by a processor(s), cause the processor to perform portions of interaction 400. In one embodiment, contact center equipment 204 comprises session boarder controller 402, media server 404, event server 406, and signaling server 408.

In one embodiment, session boarder controller 402 provides firewall protection to contact center equipment 204, and/or other components, from attacks originating elsewhere on network 104 and/or other security functions. Session boarder controller 402 may provide protocol translations of the media portion of a session and/or translation of signals of the signaling portion of a session. Session boarder controller 402 comprises a fixed number of simultaneous sessions and/or bandwidth. If a call is forked unnecessarily session boarder controller 402 may be unable to accept another call.

In another embodiment, media server 404 provides media to and from endpoints of a communication session. Media server 404 may bridge multiple streams into a conference, decode DTMF tones, play announcements, process voice scripts, and/or other services. Media processing server 212 may record, transcribe, or otherwise process a media stream, however, such features either apply to all calls or requires burdensome and error prone configuration to selectively apply such processing. In another embodiment, event server 406 monitors a subset of agent communication device 208 specifically designated to be monitored. Agent communication device 208 may be a computer telephony integration (CTI) server. Agent communication device 208 is operable to send events, but without regard to permissions which may exclude a call from being recorded (e.g., never record the CEO or legal team, technical support calls regarding a secret project in alpha-testing should never be recorded, etc.). Accordingly, signaling server 408 may validate a call and, if valid provide signals (e.g., message 426) to cause the additional processing of the media.

Generally, interaction 400 begins with message 302 (see FIG. 3) being received at session boarder controller 402. Session boarder controller 402 includes session description protocol (SDP) information describing the media session in message 422 (INVITE) to signaling server 408. Event server 406 is continually monitoring select agent communication devices, one embodiment, one of the monitored agent communication devices is agent communication device 208. Event server 406 may not be responsive, or immediately responsive, to a particular call. In other words, event server 406 may promptly issue event 424 (an event associated with forking the media for subsequent processing by media processing server 212). However, event 424 may come at a later time, such as while the call is on hold or in queue waiting to be accepted by agent communication device 208. Event 424 may also occur after the call has been answered by agent communication device 208, rendering forking no longer possible. Session boarder controller 402 may timeout without receiving an appropriate response. Accordingly, message 422 may comprise one or more messages, such as SIP 100 TRYING or SIP 180 RINGING to keep session boarder controller 402 from closing the invite. It should be appreciated that the session may still be connected to agent communication device 208, but once connected, forking is no longer possible.

While waiting for a response to message 420, session boarder controller 402 may timeout and close the session. To keep the session open, message(s) 422 may be sent periodically, such as every fifteen seconds or other interval as determined by design choice. A second timeout may be implemented such that the aggregate messages 422, if in excess of the second threshold, cause message 436 to decline the INVITE, such as a SIP 404 NOT FOUND, SIP 487 REQUEST TERMINATED, or SIP 403 FORBIDDEN. The session comprising the media portion between customer communication device 108 and agent communication device 208 is unaffected.

In another embodiment, signaling server 408 validates call in step 426, such as to ensure no policies are violated if the media were subject to the additional media processing of media processing server 212. If it would, message 436 may be triggered or, alternatively, signaling server 408 may omit the next step (sending message 428) causing a timeout and omit media forking. However, if signaling server 408 validates the call, message 428 is sent to media server 404 comprising an SDP offer and receiving in return message 430 comprising the SDP answer. In response, signaling server 408 sends message 432 (SIP 200 OK, with SDP) to session boarder controller 402. Message 432 is in response to message 420 and, as a result, session boarder controller 402 sends message 304 and receives message 306 (see FIG. 3) and replies with message 308, thereby establishing a first RTP media session between agent communication device 208 and customer communication device 108 (see FIG. 3). Additionally, the media is forked by session boarder controller 402 with media server 404 as RTP media session 434. From there, media server 404 provides the media to media processing server 212 via procedure calls 314. Throughout interaction 400, CTI messages are sent as they occur from event server 406 to media processing server 212.

Figure 5:
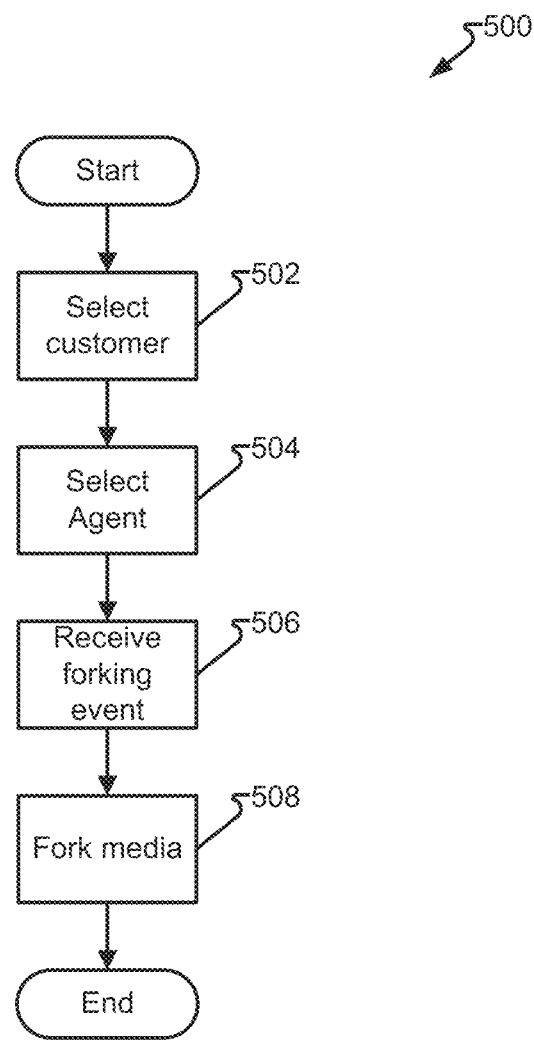
FIG. 5 depicts a process in accordance with embodiments of the present disclosure.

FIG. 5 depicts process 500 in accordance with embodiments of the present disclosure. In one embodiment, process 500 is embodied as machine-executable instructions maintained in a non-transitory memory that, when read by a processor(s), cause the processor to perform the steps of process 500. Generally, process 500 is executed upon the receipt of event 424 prior to a SIP INVITE, such as may occur with an outbound call to customer communication device 108.

Step 502 selects a customer, such as an address of customer communication device 108 and, in step 504 an agent for the communication. The agent may be specifically identified or identified as a member of a pool of candidate agents that, when customer communication device 108 is answered, is selected and connected via their respective agent communication device. Accordingly, session boarder controller 402 may sent the first INVITE to customer communication device 108 and receive therefrom a SIP 200 OK message. Subsequently, step 506 receives the forking event, if not already received, and in step 508 forks the media, such as by establishing a first media session, comprising one RTP session, between customer communication device 108 and agent communication device 208 and a second media portion, comprising a second RTP session with media server 404 and media processing server 212

Figure 6:
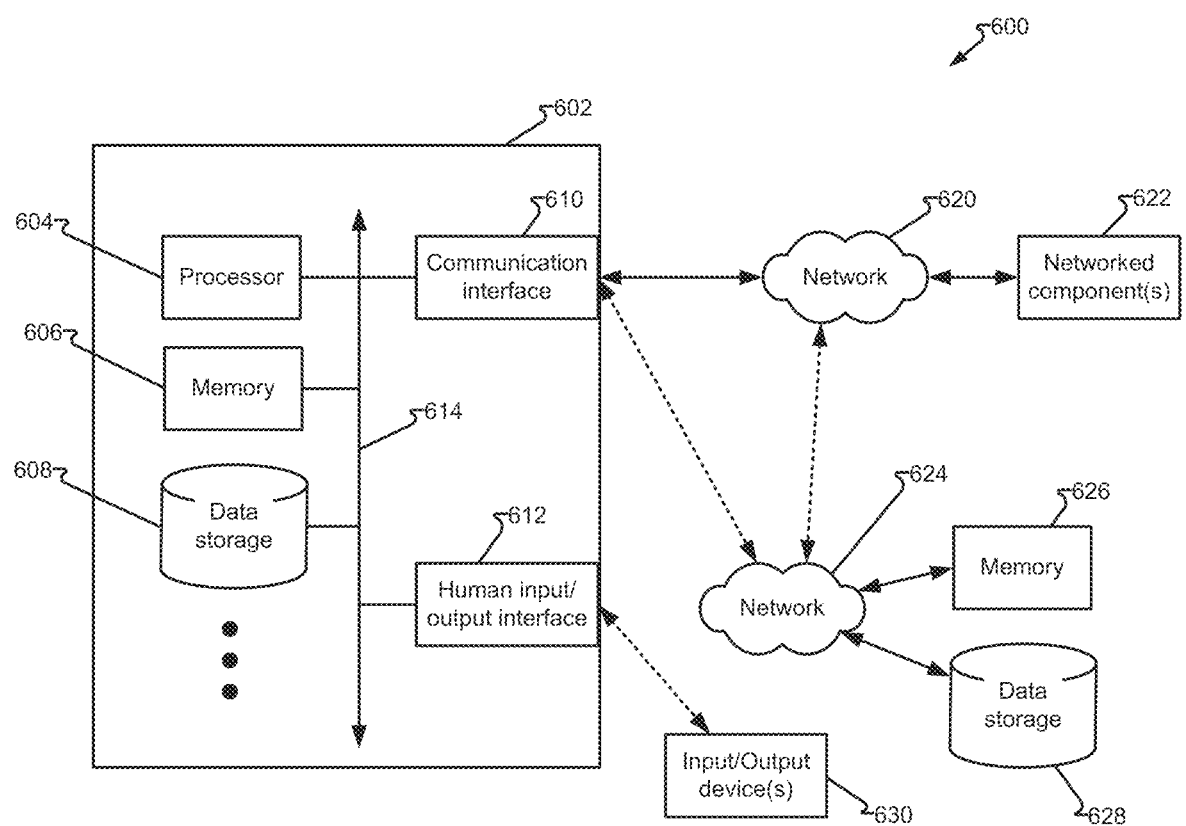
FIG. 6 depicts a third system in accordance with embodiments of the present disclosure.

FIG. 6 depicts device 602 in system 600 in accordance with embodiments of the present disclosure. In one embodiment, session boarder controller 402, media server 404, event server 406, signaling server 408, and/or agent communication device 208 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or utilize one or more networks, such as network 620 and/or network 624.

Network 104 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, such as contact center 102, whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. For example, a connection between one particular customer, using a particular customer communication device 108, may be enabled (or disabled) with a particular networked component 622 and/or particular resource 112. Similarly, one particular networked component 622 and/or resource 112 may be enabled (or disabled) from communicating with a particular other networked component 622 and/or resource 112, including, in certain embodiments, device 602 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARIV1926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for selectively processing real-time media, comprising: receiving, via a network interface to a network, a request for a communication session from a customer communication device, wherein the request for the communication session comprises a Session Initiation Protocol (SIP) INVITE message, wherein the INVITE message is received by a session border controller (SBC), wherein the communication session comprises a media portion and a signaling portion, and wherein the SBC omits forking the media portion in response to the request; determining that an attribute of the request indicates that the media portion of the communication session is eligible to be forked; after receipt of the request and before receiving a forking event, providing a series of preservation messages to the SBC at an interval therebetween that is less than a first timeout interval of the SBC; and upon receiving the forking event, signaling the SBC to route one fork for connection to an agent communication device and route a second fork to a media processing server.

2. The method of claim 1, wherein the SBC routes the second fork to the media processing server only upon a second timeout interval, comprising a time period greater than the first timeout interval, has not yet occurred.

3. The method of claim 1, wherein the forking event is received from a computer telephony integration (CTI) server.

4. The method of claim 1, wherein the series of preservation messages comprise a series of at least one SIP 100 TRYING message or SIP 180 RINGING message.

5. The method of claim 1, further comprising receiving a decline forking event and, in response thereto, signaling the SBC to exclude routing of the second fork to the media processing server.

6. The method of claim 1, further comprising, at least one of recording or transcribing the second fork by the media processing server.

7. The method of claim 1, further comprising, analyzing the content of the second fork by the media processing server.

8. The method of claim 4, wherein the analyzing of the content comprises determining an emotion from vocal patterns of a customer utilizing the customer communication device.

9. The method of claim 1, wherein the forking event is received prior to the SIP INVITE message and wherein the SIP INVITE is sent to the customer communication device.

10. A system for selectively processing real-time media, comprising:
  a session border controller (SBC) comprising a network interface to a network;
  a media processing server;
  a signaling server;
  wherein each of the SBC, media server, and signaling server are interconnected and each comprise a processor with machine-readable instructions maintained in a non-transitory memory that, when read by the processor, cause the processor to execute the machine-readable instructions;
  wherein the SBC, via the network, receives a request for a communication session from a customer communication device, wherein the request for the communication session comprises a Session Initiation Protocol (SIP) INVITE message, the communication session comprises a media portion and a signaling portion, and wherein the SBC omits forking the media portion in response to the request;
  wherein the SBC, in response to receiving the SIP INVITE, provides a second SIP INVITE message to the signaling server which responds with a series of preservation messages to the SBC at an interval therebetween that is less than a first timeout interval of the SBC;
  wherein the SBC, while receiving the series of preservation messages, maintains the request and the SBC, upon termination of receipt of the series of preservation messages, terminates the request; and
  wherein the SBC, upon receiving the forking signal and when the request is maintained, creates and routes one fork for connection to an agent communication device and creates and routes a second fork to the media processing server.

11. The system of claim 10, further comprising:
an event server;
wherein the event server is interconnected with the SBC, media server, and signaling server, and comprises an event server processor with machine-readable instructions maintained in a non-transitory memory that, when read by the processor, cause the event server processor to execute the machine-readable instructions; and
wherein the event server receives the SIP INVITE message and executes the machine-readable instructions to determine whether a forking decision is to be made and, when determined in the affirmative, provides the forking signal.

12. The system of claim 10, wherein the SBC routes the second fork to the media processing server only upon a second timeout interval, comprising a time period greater than the first timeout interval, has not yet occurred.

13. The system of claim 11, wherein the event server comprises a computer telephony integration (CTI) server.

14. The system of claim 11, wherein the series of preservation messages comprise a series of at least one SIP 100 TRYING message or SIP 180 RINGING message.

15. The system of claim 11, further comprising receiving a decline forking event and, in response thereto, signaling the SBC to exclude routing of the second fork to the media processing server.

16. The system of claim 11, wherein the media processing server processes the media portion comprising at least one of recording, transcribing, or analyzing the vocal patterns of a customer providing a portion of the content of the media portion.

17. The system of claim 11, wherein the forking event is received prior to the SIP INVITE message and wherein the SIP INVITE message is sent to the customer communication device.

18. A method for selectively processing real-time media, comprising:
selecting a customer and an agent to engage in a communication session over a network utilizing a customer communication device and an agent communication device, respectively, wherein the communication session comprises a media portion and a signaling portion;
prompting an event server to provide a forking event, wherein the prompting comprises serially sending each of a number of prompts intermittently to the event server, and wherein the sending the number of prompts are terminated upon a timeout; and
upon receiving the forking event and prior to the timeout, sending, via a network interface to a network, a request for the communication session to the customer communication device, wherein the request for the communication session comprises a Session Initiation Protocol (SIP) INVITE message and wherein the INVITE message is sent by a session border controller (SBC), and signaling the SBC to route one fork for connection to an agent communication device and route a second fork to a media processing server.

19. The method of claim 18, further comprising at least one of recording or transcribing the second fork by the media processing server.

20. The method of claim 19, wherein the analyzing of the content comprises determining an emotion from vocal patterns of a customer utilizing the customer communication device.

* * * * *

UNITED STATES PATENT AND TRADEMARK OFFICE
CERTIFICATE OF CORRECTION

PATENT NO. : 11,716,360 B2
APPLICATION NO. : 17/148225
DATED : August 1, 2023
INVENTOR(S) : Jeffery Aigner, Matthew Peters and Robert Braudes It is certified that error appears in the above-identified patent and that said Letters Patent is hereby corrected as shown below:

In the Claims

At Column 19, Line 58, after "wherein the" insert --SIP-- therein.

At Column 20, Line 24, please delete the first occurrence of "the".

At Column 21, Line 29, after "or analyzing" delete "the" therein.

At Column 21, Line 30, after "providing a portion of" delete "the" therein.

At Column 22, Line 1, please delete "the" and insert --a-- therein.

At Column 22, Line 22, after "wherein the" insert --SIP-- therein.

At Column 22, Line 30, please delete "wherein the" and insert --further comprising-- therein.

At Column 22, Line 30, after "analyzing" delete "of the" therein.

At Column 22, Line 31, please delete "comprises" and insert --of the media portion by-- thereof.

Signed and Sealed this
Twenty-first Day of November, 2023

Katherine Kelly Vidal
*Director of the United States Patent and Trademark Office*